(12) United States Patent
Bandyopadhyay et al.

(10) Patent No.: US 11,580,389 B2
(45) Date of Patent: Feb. 14, 2023

(54) SYSTEM AND METHOD FOR PREDICTING FALL ARMYWORM USING WEATHER AND SPATIAL DYNAMICS

(71) Applicant: International Business Machines Corporation, Armonk, NY (US)

(72) Inventors: Sambaran Bandyopadhyay, Hooghly (IN); Sachin Gupta, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 16/742,889

(22) Filed: Jan. 14, 2020

(65) Prior Publication Data

US 2021/0216861 A1 Jul. 15, 2021

(51) Int. Cl.
*G06N 3/08* (2006.01)
*G06F 16/29* (2019.01)
*G01W 1/10* (2006.01)
*G06K 9/62* (2022.01)

(52) U.S. Cl.
CPC ............ *G06N 3/08* (2013.01); *G01W 1/10* (2013.01); *G06F 16/29* (2019.01); *G06K 9/6259* (2013.01)

(58) Field of Classification Search
CPC .......... G06N 3/08; G06F 16/29; G01W 1/10; G06K 9/6259
See application file for complete search history.

(56) References Cited

U.S. PATENT DOCUMENTS

| 9,563,852 B1* | 2/2017 | Wiles | A01B 79/005 |
| 10,372,991 B1* | 8/2019 | Niemasik | G06F 16/23 |
| 11,003,334 B1* | 5/2021 | Conway | G06Q 40/08 |
| 11,191,215 B1* | 12/2021 | Robertson | A01F 12/26 |
| 2006/0093208 A1* | 5/2006 | Li | G06V 40/172 |
| | | | 382/190 |

(Continued)

FOREIGN PATENT DOCUMENTS

AU 2010330915 A1 7/2012

OTHER PUBLICATIONS

Nagoshi, Predictive Modeling and Mitigation of the Effects of Climate Change on The Infestation Patterns of a Migratory Crop Pest Insect, Agricultural Research Service, 23 Pages.

(Continued)

*Primary Examiner* — Ninos Donabed
(74) *Attorney, Agent, or Firm* — Daniel Morris; Otterstedt & Kammer PLLC

(57) ABSTRACT

A dynamic graph includes a plurality of nodes and edges at a plurality of time steps; each node corresponds to a geographic location in a first area where pest infestation information is available for a subset of locations. Each edge connects two of the nodes which are geographically proximate, has a direction based on wind direction, and has a weight based on relative wind speed. Assign node features based on weather data as well as labels corresponding to pest infestation severity. Train a graph convolutional network on the dynamic graph. Based on predicted future weather conditions for a second area different than the first area, use the trained graph convolutional network to predict, via inductive learning, pest infestation severity for future times for a new set of nodes corresponding to new geographic locations in the second area for which no pest infestation information is available.

11 Claims, 8 Drawing Sheets

(56) References Cited

U.S. PATENT DOCUMENTS

| | | | |
|---|---|---|---|
| 2008/0157990 A1* | 7/2008 | Belzer | G06Q 10/087 340/678 |
| 2011/0047646 A1 | 2/2011 | Manzanero | |
| 2012/0148497 A1* | 6/2012 | Alves | A01N 25/006 514/4.5 |
| 2013/0070986 A1* | 3/2013 | Peleg | G06K 9/6254 382/128 |
| 2014/0073592 A1* | 3/2014 | Pszczolkowski | A01N 43/90 514/568 |
| 2014/0279600 A1* | 9/2014 | Chait | A01M 23/00 705/317 |
| 2015/0196002 A1* | 7/2015 | Friesth | A01G 31/00 315/297 |
| 2016/0078569 A1* | 3/2016 | Ethington | G06Q 10/04 705/7.37 |
| 2016/0150744 A1* | 6/2016 | Lin | A01M 31/002 43/132.1 |
| 2016/0202227 A1* | 7/2016 | Mathur | G06F 30/00 702/2 |
| 2017/0027155 A1* | 2/2017 | Ehrlich | G01S 13/08 |
| 2017/0032509 A1* | 2/2017 | Mannar | G06T 7/90 |
| 2017/0082568 A1* | 3/2017 | Pillai | G01N 33/246 |
| 2017/0249512 A1* | 8/2017 | McClatchie | G06Q 50/02 |
| 2018/0017965 A1* | 1/2018 | Kosa | G05D 1/0022 |
| 2018/0084772 A1* | 3/2018 | Peeters | A01M 1/026 |
| 2018/0125052 A1* | 5/2018 | Johnson | A01M 1/023 |
| 2018/0288977 A1* | 10/2018 | Hummer | G08B 21/182 |
| 2018/0293869 A1* | 10/2018 | Padhye | G08B 21/10 |
| 2018/0299842 A1* | 10/2018 | Reid | A01M 23/00 |
| 2019/0021238 A1* | 1/2019 | Alexander | B25J 9/0093 |
| 2019/0050741 A1* | 2/2019 | Mewes | G06N 20/00 |
| 2019/0050948 A1* | 2/2019 | Perry | G06V 20/188 |
| 2019/0059202 A1* | 2/2019 | Lorek | A01B 79/005 |
| 2019/0380325 A1* | 12/2019 | Bender | A01M 99/00 |
| 2020/0019777 A1* | 1/2020 | Gurzoni, Jr. | G06K 9/6289 |
| 2020/0244890 A1* | 7/2020 | Peters | H04N 5/23299 |
| 2021/0084885 A1* | 3/2021 | Peters | A01M 7/0042 |
| 2021/0315168 A1* | 10/2021 | Readick | A01B 79/005 |
| 2021/0342713 A1* | 11/2021 | D'Elia | A01M 1/026 |
| 2021/0350295 A1* | 11/2021 | Singh | A01B 79/005 |

OTHER PUBLICATIONS

Wu et al., Estimation of the Potential Infestation Area of Newly-invaded Fall Armyworm *Spodoptera frugiperda* in the Yangtze River Valley of China, Insects 10, No. 9, 2019, 298, 15 pages.

Nagoshi et al., Analysis of strain distribution, migratory potential, and invasion history of fall armyworm populations in northern Sub-Saharan Africa, Scientific Reports 8:3710, 2018, 10 pages.

Chulu et al., Developing an automated fall army worm (faw) Identification and early warning and monitoring system based on ANN techniques, Proceedings of the ICTSZ International Conference in ICTs (ICICT2018) pp. 112-118.

Li et al., Prediction of migratory routes of the invasive fall armyworm in eastern China 2 using a trajectory analytical approach, Pest Management Science, 2019, 39 pages.

Kipf et al. Semi-Supervised Classification with Graph Convolutional Networks, Published as a conference paper at ICLR 2017, arXiv:1609.02907v4 [cs.LG], 14 pages.

Brownlee, A Gentle Introduction to the Rectified Linear Unit (ReLU), downloaded Jan. 10, 2020 from https://machinelearningmastery.com/rectified-linear-activation-function-for-deep-learning-neural-networks, 22 pages.

Niassy et al., Exploring the best tactics to combat fall armyworm outbreaks in Africa, downloaded Jan. 9, 2020 from theconversation.com/exploring-the-best-tactics-to-combat-fall-armyworm-outbreaks-in-africa-95451, 5 pages.

Fall army, Wikipedia, downloaded Jan. 6, 2020, 9 pages.

Kipf, Graph Convolutional Networks, downloaded Jan. 9, 2020 from https://tkipf.github.io/graph-convolutional-networks/, 13 pages.

Peter Mell and Timothy Grance, The NIST Definition of Cloud Computing, NIST Special Publication 800-145, Computer Security Division, National Institute of Standards and Technology, Sep. 2011, cover, pp. i-iii and 1-3.

* cited by examiner

601

$$f(H^{(l)}, A) = \sigma\left(\hat{D}^{-\frac{1}{2}}\hat{A}\hat{D}^{-\frac{1}{2}} \overset{\text{WEATHER FEATURES}}{H^{(l)}} W^{(l)}\right)$$

603

$$h_{v_i}^{(l+1)} = \sigma\left(\sum_j \frac{1}{c_{ij}} h_{v_j}^{(l)} W^{(l)}\right)$$

*FIG. 6*

SYSTEM AND METHOD FOR PREDICTING FALL ARMYWORM USING WEATHER AND SPATIAL DYNAMICS

BACKGROUND

The present invention relates to the electrical, electronic and computer arts, and more specifically, to application of machine learning systems to agriculture and the like.

Fall Armyworm (FAW) is a category of pests that can destroy a wide variety of crops, which causes large economic damage. FAW is the larval life stage of a fall armyworm moth. FAW has been spreading globally in recent years.

Maize has been a primary target of attack of FAW in some recently-infected areas. Furthermore, there is also evidence of the presence of the pest in some other crops in such areas, such as rice grown in paddies, sugarcane, sweet corn, bajra, jowar and ragi. Inasmuch as maize is a major ingredient for poultry and cattle feed, the total loss of FAW indirectly includes the effect on meat and milk production.

Prediction of FAW is challenging due to a number of factors. Learning a generic weather-based model to estimate the ideal condition(s) for the pest to survive and to create damage is difficult, as it is very location-specific. Spreading of FAW has a strong spatial aspect. Since FAW moths can fly fast, the spread of the disease at the location(s) of interest depends on the current severity of the pest in neighboring locations. Indeed, the FAW migration rate is remarkably fast, estimated at 300 miles per generation. Furthermore, weather factors such as wind speed and wind direction also play an important role in the spatial spread of this pest.

SUMMARY

Principles of the invention provide techniques for predicting fall armyworm (or similar pests) using weather and spatial dynamics. In one aspect, an exemplary method includes the step of creating, in a computer memory, a data structure representing a dynamic graph including a plurality of nodes and a plurality of edges connecting the nodes, at a plurality of time steps, wherein each node corresponds to a geographic location in a first area, and wherein pest infestation information, relating to an airborne pest whose propagation depends on weather and wind speed, is available for a subset of the geographic locations. Each edge: connects two of the nodes which are geographically proximate; has a direction, for a given one of the time steps, based on relative wind direction between the two nodes for the given one of the time steps; and has a weight, for the given one of the time steps, based on relative wind speed between the two nodes for the given one of the time steps. Further steps include, in the data structure, assigning features to each of the nodes for each of the time steps based on weather data at the corresponding geographic locations at each of the time steps; in the data structure, assigning labels to each of the nodes for each of the time steps, corresponding to pest infestation severity for each of the time steps, the labels being assigned to those of the nodes corresponding to the subset of the geographic locations for which the pest infestation information is available; training a graph convolutional network on the dynamic graph with the assigned features and assigned labels; and, based on predicted future weather conditions for a second area different than the first area, using the trained graph convolutional network to predict, via inductive learning, pest infestation severity for future times for a new set of nodes corresponding to new geographic locations in the second area for which no pest infestation information is available.

In one aspect, an exemplary apparatus includes a memory; and at least one processor, coupled to the memory, and operative to create, in the memory, a data structure representing a dynamic graph including a plurality of nodes and a plurality of edges connecting the nodes, at a plurality of time steps, wherein each node corresponds to a geographic location in a first area, and wherein pest infestation information, relating to an airborne pest whose propagation depends on weather and wind speed, is available for a subset of the geographic locations. Each edge: connects two of the nodes which are geographically proximate; has a direction, for a given one of the time steps, based on relative wind direction between the two nodes for the given one of the time steps; and has a weight, for the given one of the time steps, based on relative wind speed between the two nodes for the given one of the time steps. The at least one processor is further operative to, in the data structure, assign features to each of the nodes for each of the time steps based on weather data at the corresponding geographic locations at each of the time steps; in the data structure, assign labels to each of the nodes for each of the time steps, corresponding to pest infestation severity for each of the time steps, the labels being assigned to those of the nodes corresponding to the subset of the geographic locations for which the pest infestation information is available; train a graph convolutional network on the dynamic graph with the assigned features and assigned labels; and, based on predicted future weather conditions for a second area different than the first area, use the trained graph convolutional network to predict, via inductive learning, pest infestation severity for future times for a new set of nodes corresponding to new geographic locations in the second area for which no pest infestation information is available. The apparatus optionally has a network interface coupled to the at least one processor that sends a signal into a communications network, such as a wireless communications network, to alert farmers to initiate amelioration action(s) where new infestations are predicted.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media)

and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

a system that considers both spatial dynamics (e.g., different locations, their distance, wind speed and direction between them) and temporal data (e.g., present severity of FAW attack, different weather parameters over time) of the FAW attack distribution;

a method that formulates the problem as attributed dynamic graphs and uses a graph convolution neural network with an added L2 penalty term (between the parameter matrices of graph convolution for any two graphs from the consecutive time steps) to ensure temporal smoothness of the FAW severity;

a system and method that are inductive in nature, i.e., can even work for a new set of neighboring locations for which no FAW attack data is present.

These and other features and advantages of the present invention will become apparent from the following detailed description of illustrative embodiments thereof, which is to be read in connection with the accompanying drawings.

BRIEF DESCRIPTION OF THE DRAWINGS

FIG. 6 illustrates equations related to the GCN of FIG. 5, according to an aspect of the invention;

DETAILED DESCRIPTION

Figure 1:
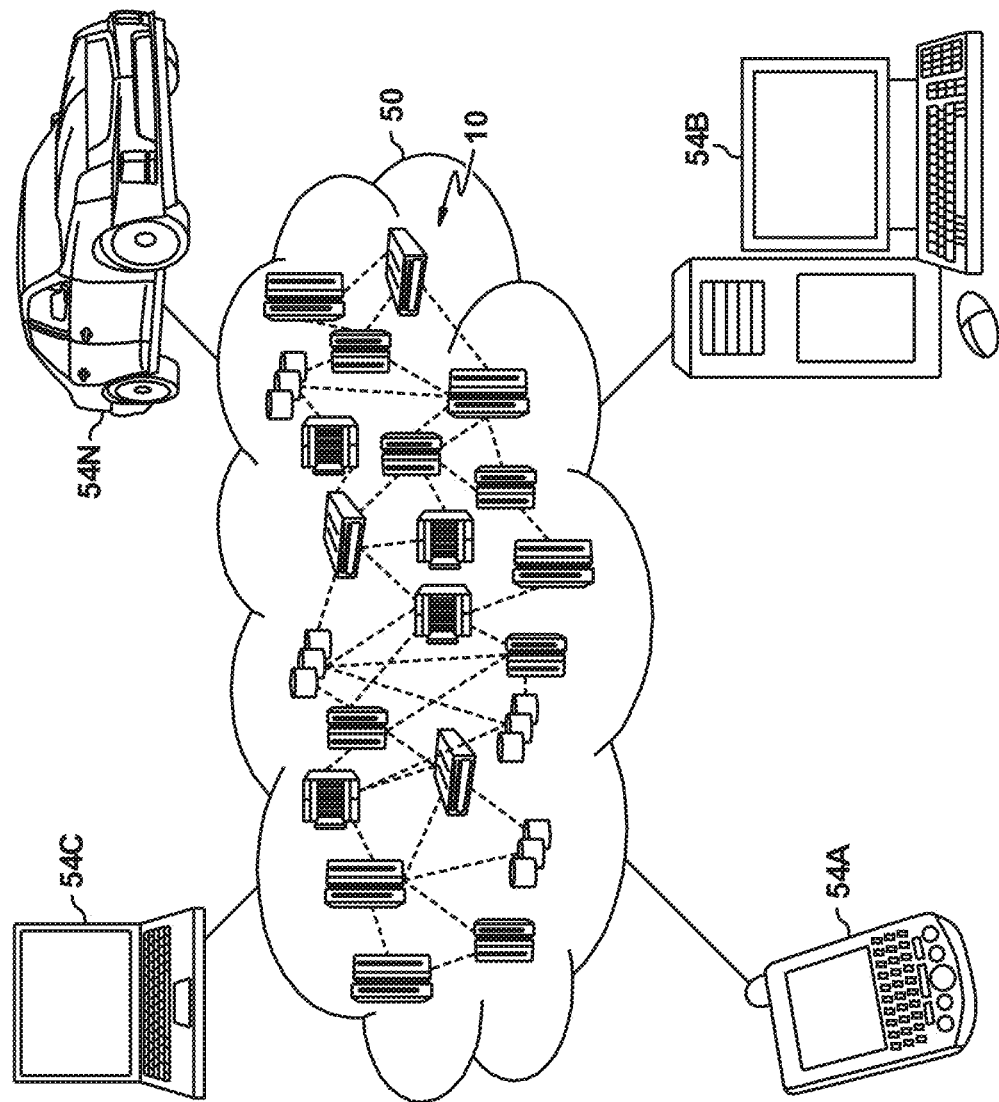
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
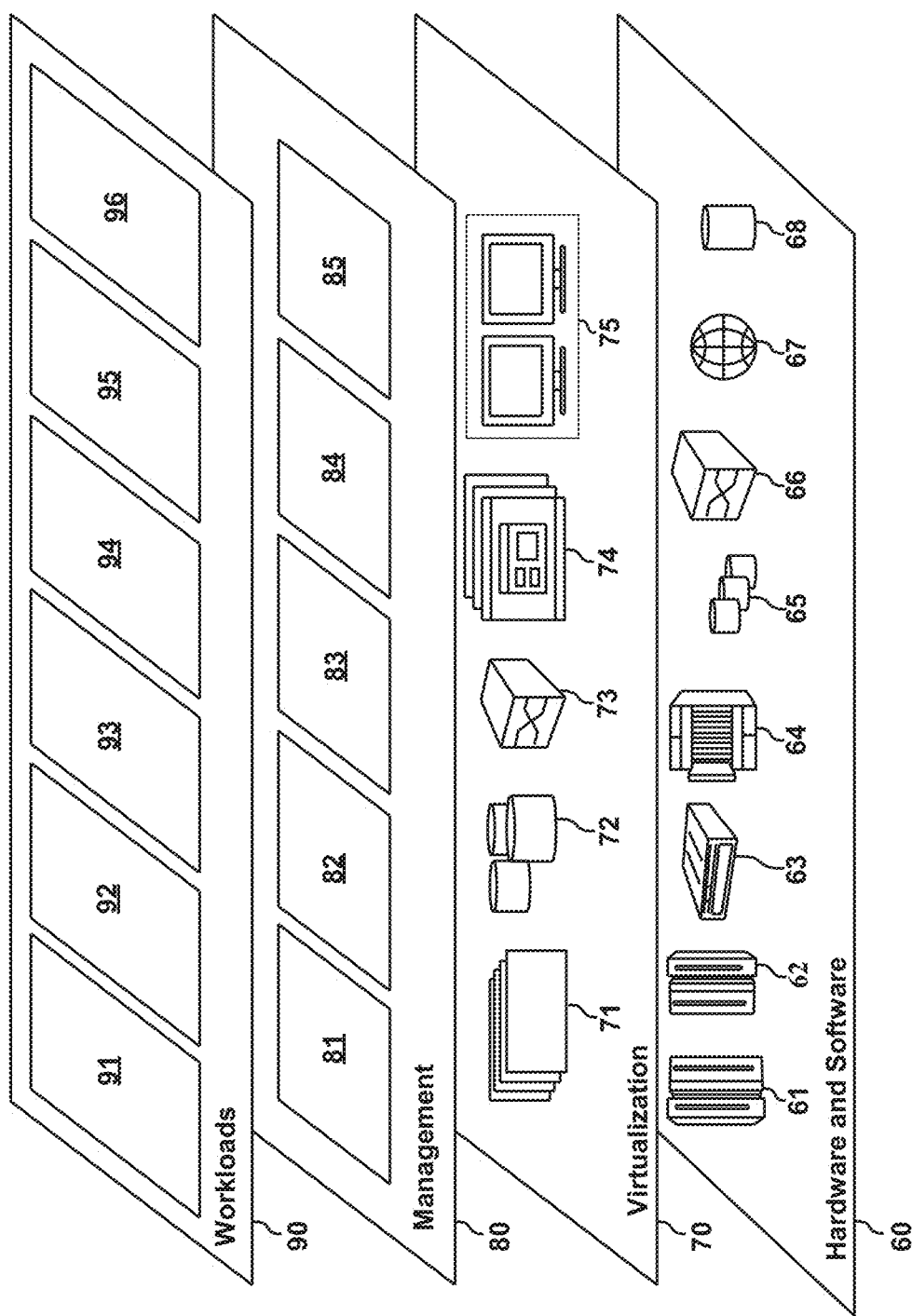
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cloud-based service 96 for predicting fall armyworm using weather and spatial dynamics, it being understood that cloud, non-cloud, and combined approaches could be employed. For example, any one, some, or all of the models disclosed herein, once trained, can be deployed in the cloud.

One or more embodiments advantageously address the problems of predicting FAW in a joint framework. Indeed, one or more embodiments predict/forecast FAW attack at a selected set of locations, based on: spatial and temporal pattern of the severity of FAW moths in the set of locations of interest; current weather condition (e.g., temperature, relative humidity, precipitation) at all the locations considered; and wind direction and wind speed between the neighboring locations. Advantageously, one or more embodiments are capable of predicting/forecasting FAW attack for a set of locations, some of which already have data/evidence of FAW attacks (i.e., transductive learning); and/or predicting/forecasting FAW attack for a set of new locations with unknown evidence of FAW attacks (inductive learning).

It is currently believed that the total economic value of crops that could be affected by FAW is about $1.3 trillion (US); that about 6% of crops worldwide are damaged by FAW; that the total value of damaged crops is about $78 billion (US); that about 20% of at-risk crops could be saved with an effective early alert; and that, accordingly, there is a potential benefit of $15.6 billion (US) in effective alert capability.

One or more embodiments provide a system and/or method for predicting and forecasting FAW attack severity, over time, for a set of locations of interest. In a first step, construct a dynamic graph (i.e., a graph structure where the weights of the edges change over time) using the appropriate set of locations (to capture the spatial and dynamic pattern(s) of FAW attack(s)). Consider each location as a node of the graph. Two locations are connected by an edge if they are close (within a threshold) to each other. (This threshold can be determined, for example, by the physical properties (such as velocity of migration, life cycle, etc.) of the FAW moths or any other pests, or the threshold can be tuned based on the historical data of the disease severity.) The direction (dynamic) of an edge at a time t is formed by the relative wind direction between the two adjacent nodes, which can indicate the direction of FAW migration. The weight (dynamic) of an edge at a time t is formed by the relative wind speed between the two adjacent nodes, which can indicate the rate of FAW migration.

In a second step, assign node features using weather data, and node labels using existing FAW attack data. Use the set of weather data (temperature, relative humidity (RH), precipitation) as the set of features for any node (equivalent to a location). Use the existing FAW attack severity (1, 2, 3, etc.) at time t as the labels for a subset of nodes.

In a third step, train (can also be referred to as "learn") a Graph Convolution Network (GCN) on the constructed graph. Learn the parameter(s) of the GCN for the dynamic graphs where some nodes have labels. Predict the labels (severity of FAW attack at time t) of other nodes of the dynamic graph using the GCN (transductive learning).

In a fourth step, learn the severity of the FAW attack of other nodes of the dynamic graph where all the nodes are unlabeled. Use the inductive capability of the learned GCN on the other set of graphs.

For FAW attack forecasting, use weather forecast data as the node features and use the learned GCN to forecast the node labels.

Note that the steps are designated first through fourth in an exemplary embodiment; other embodiments can employ a different order of steps, subset of steps, superset of steps, and the like, where appropriate.

Figure 3:
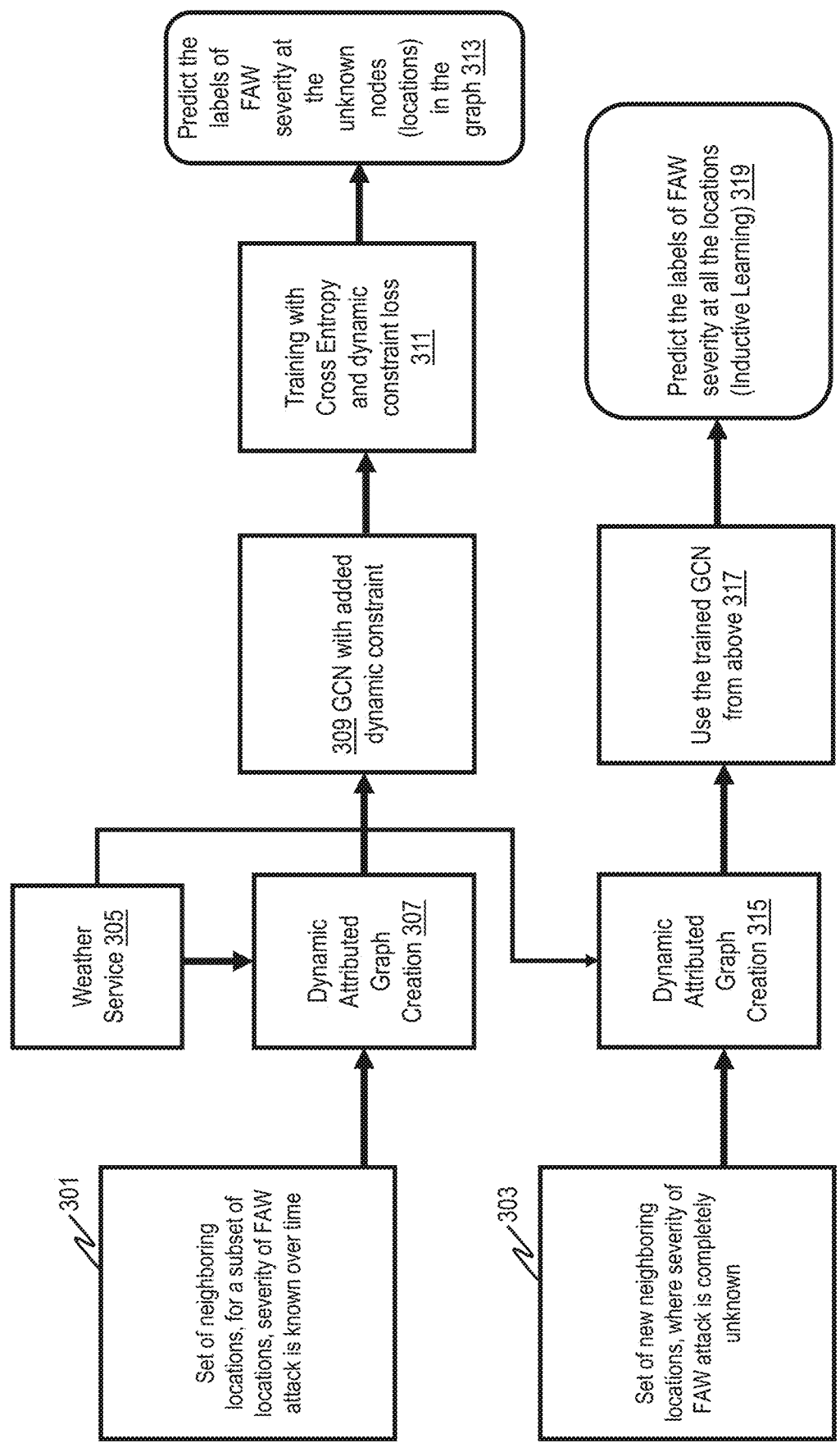
FIG. 3 is a block diagram of an exemplary system, according to an aspect of the invention.
Figure 4:
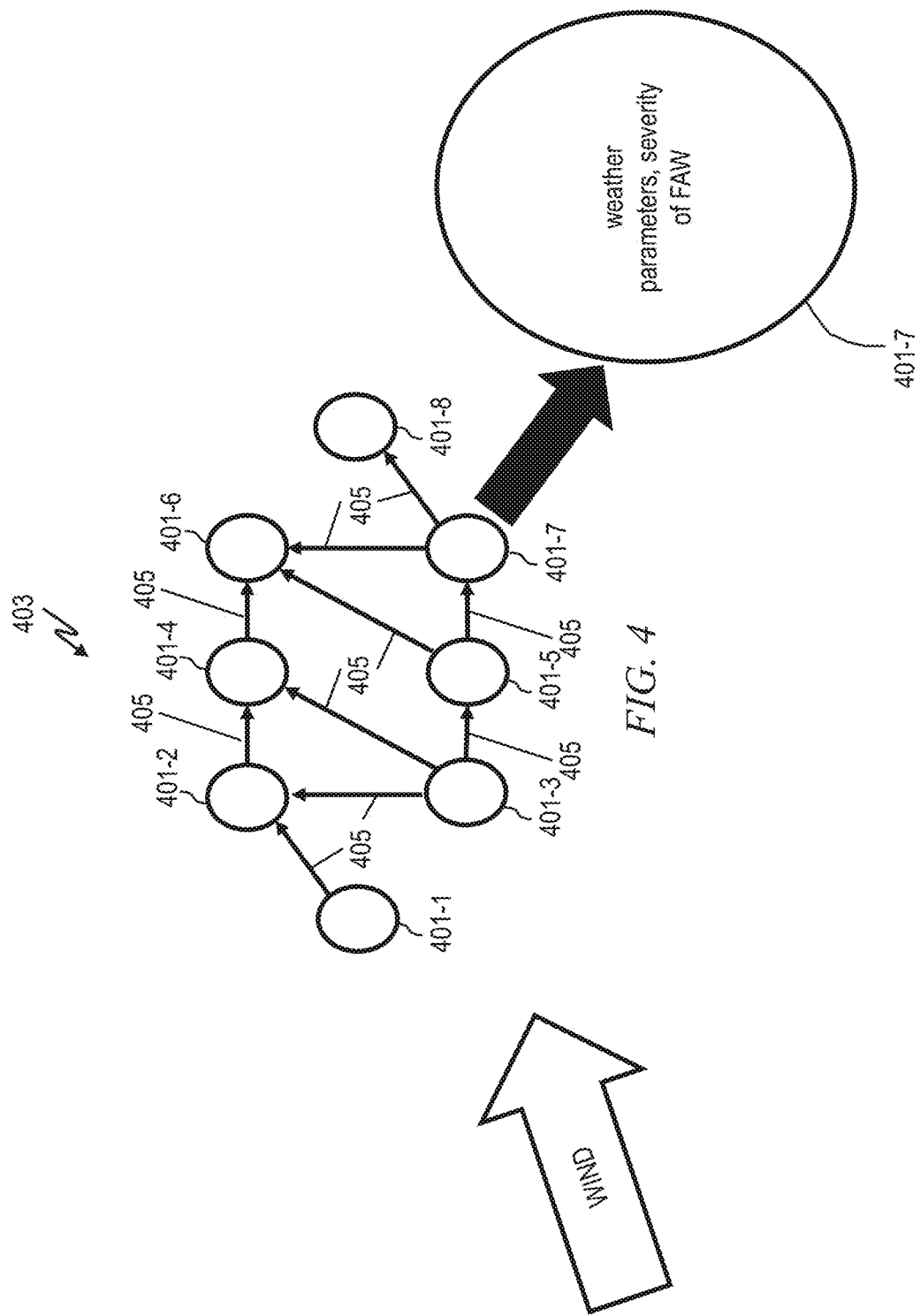
FIG. 4 illustrates conversion of a problem to a dynamic attributed graph, according to an aspect of the invention.
Figure 5:
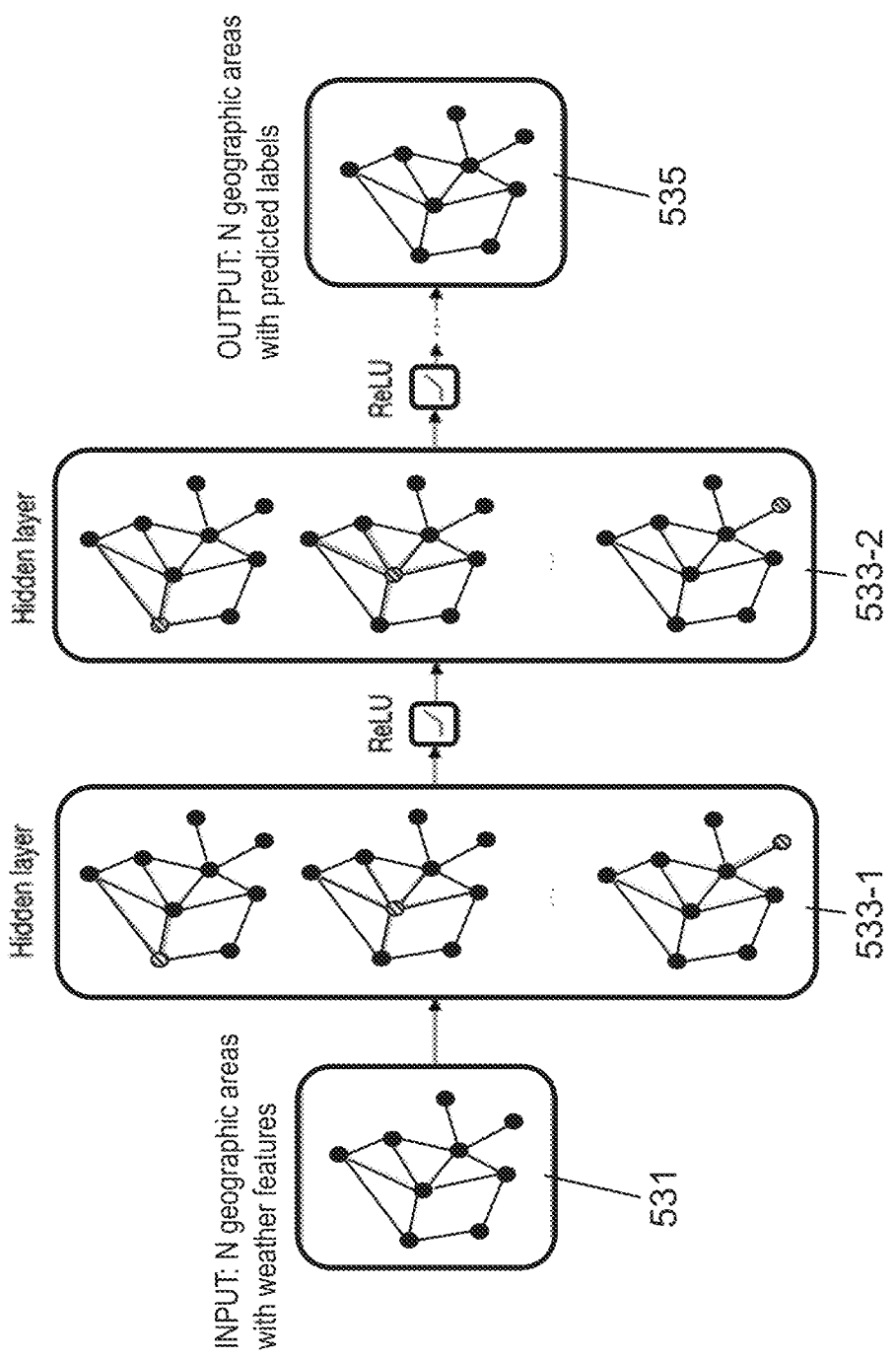
FIG. 5 illustrates a graph convolution network (GCN), according to an aspect of the invention.

Currently, there are systems available for stacking certain Cry genes along with Cry 1Fa to result in products that are more durable and less prone towards FAW attack; there are also systems available for predicting the migratory routes of FAW and applying machine learning based techniques, such as neural networks, in predicting FAW attack(s) using collected data from locally installed sensors.

Currently, however, there is no system or methodology available which predicts the severity of attack of FAW by converting the problem into a dynamic attributed graph and which can also be applied where there is no FAW historical data available.

As noted above, one or more embodiments provide one or more of: a system that considers both spatial dynamics (e.g., different locations, distance between the locations, wind speed and direction between them) and temporal data (e.g., present severity of FAW attack, different weather parameters over time) of the FAW attack distribution; a method that formulates the problem as attributed dynamic graphs and uses a graph convolution neural network with an added L2 penalty term (between the parameter matrices of graph convolution for any two graphs from the consecutive time steps,) to ensure temporal smoothness of the FAW severity; and a system and method that are inductive in nature, i.e., can even work for a new set of neighboring locations for which no FAW attack data is present.

Referring to the system diagram of FIG. 3, as seen at 301, one or more embodiments train on a set of neighboring locations, where for a subset of the neighboring locations, the severity of FAW attack is known over time. As seen at 307, convert the problem to a dynamic attributed graph. Referring also to FIG. 4, given a set of locations (e.g., districts of a state/country/continent/geographical region as represented at 301) and their distances, represent each location by a node 401-1, 401-2, 401-3, 401-4, 401-5, 401-6, 401-7, 401-8 of a graph 403 (there can be any number of nodes; eight is a non-limiting example). Two nodes are connected by an edge 405 if their distance is less than some threshold. The wind direction (see block arrow labeled "wind") between two locations determines the direction of the edge and the wind speed determines the edge weight. The weather parameters of a location, such as temperature, relative humidity and rainfall, can be obtained from weather service 305 and form the features of the node. Label the nodes with the severity of FAW attack (label 0 if no FAW occurrence) in the locations corresponding to the nodes. The node features/labelling can be seen in the enlargement of node 401-7 indicated by the solid black block arrow. FIG. 4 is thus a directed attributed graph. Node features; edge weight, edge direction; and node labels change over time as, for example, weather parameters and wind can change. Hence, there will be a different directed attributed graph like FIG. 4 for each time step; the resultant collection of graphs moving forward in time is a dynamic attributed directed graph.

FIG. 5 shows methodological aspects of a graph convolutional network (GCN). The skilled artisan will be familiar with GCNs from, for example, Thomas N. Kipf and Max Welling, *Semi-supervised classification with graph convolutional networks*, arXiv preprint arXiv:1609.02907, Sep. 9, 2016, hereby expressly incorporated by reference herein, in its entirety, for all purposes. In a GCN, each node aggregates weighted attributes from its neighbors, and updates its own attributes by a weighted average of its own attributes and the attributes from its neighbors. This is followed by a non-linear activation function to update the aggregated features in each node of the graph. This update can happen over multiple layers to obtain information from multiple hops of neighbors. Note the input layer 531, hidden layers 533-1, 533-2, and output layer 535. ReLU is the rectified linear unit (other suitable non-linear activation functions could be used in other embodiments). In general, a graph designated as G has vertices V and edges E, takes as input 531 an N×D feature matrix X where N is the number of nodes and D is the number of input features, as well as an adjacency matrix (discussed below). The output 535 is an N×F feature matrix, where F is the number of output features per node. Every neural network layer 533-1, 533-2 is written as a non-linear function $H^{(l+1)}=f(H^{(l)}, A)$.

The parameters (e.g., W matrix) of the GCN neural network can be updated using a standard back propagation algorithm. Refer to equations 601 and 603 in FIG. 6. The final set of attributes can be used to predict the label (i.e., severity of an FAW attack) of a node. In the equations, j indexes the neighboring nodes of $v_i$, and $c_{ij}$ is a normalization constant for the edge $(v_i, v_j)$. In particular, A is the adjacency matrix of the graph, $\hat{A}$ is the adjacency matrix of the graph after adding self-loop to each node, $\hat{D}$ is the diagonal degree matrix of the graph after adding self-loop to each node, $H^{(l)}$ is the feature matrix at layer l of the GCN, $W^{(l)}$ is the trainable weight parameters at layer l of the GCN, and $h_{v_i}$ is the row of H which corresponds to the node $v_i$ in the graph. Note that $\sigma(\bullet)$ is a non-linear activation function, of which ReLU is a non-limiting example.

Refer now to block 309 in FIG. 3. Consider temporal constraint via node embedding for the dynamic graph. To incorporate the dynamic behavior of the graph, one or more embodiments add a constraint that embedding of a particular node (location) should not change drastically over the consecutive time steps. This ensures smoothness on the evolution of the nodes. If $h_i^t$ is the node embedding of the location i at time t, and similarly defining $h_i^{t+1}$, then minimize $\|h_i^t-h_i^{t+1}\|^2$, for all i and t.

As seen at 311, train the GCN with added dynamic constraint via cross entropy and dynamic constraint loss. As seen at 313, 319 it is then possible to predict the labels (FAW severity) at the unknown nodes (locations) in the graph representing locations 303.

As seen at 303, it is possible to predict the severity of FAW where no past information regarding FAW attack is available. Given a set of new locations 303 (where no FAW attack data is present), as represented at 315, again build a dynamic attributed directed network from the distances between the locations 303 and different weather parameters, including wind information, obtained from service 305. As seen at 317, use the learned (trained) GCN model obtained from the process in the top row of FIG. 3. Referring to 319, as each node has its own attributes from the obtained graph structure, equation 601 can be used again to compute the node embeddings and the corresponding severity of attack of FAW for the new set of locations, with the matrix W fixed in this instance.

One or more embodiments are directed towards a method and/or system for predicting Fall Armyworm (FAW) attack severity over time for a set of locations of interest using weather and spatial dynamics. One or more embodiments include: constructing a dynamic graph (i.e., graph structure where weights of the edges change over time) using the set of locations (to capture the spatial and dynamic pattern of FAW attack); assigning node features using weather data and node labels using existing data regarding FAW attack; training a graph convolution network (GCN) on the constructed graph and predicting the labels (severity of FAW attack at time t) of other nodes of the dynamic graph using the GCN (transductive learning); and learning the severity of FAW attack of other nodes of the dynamic graph where all the nodes are unlabeled.

Heretofore, there have been methods of monitoring fall armyworm migratory behavior in a region based on changing weather, historical effect areas, and seasonal patterns, including predicting attacking severity of fall armyworm over a location based on collected information and further preventing the spreading of fall armyworm in new regions. Generally, prior art techniques model the feasible condition(s) of fall armyworm based on weather, seasonal patterns and historical effect data and predict the severity of FAW attack. However, one or more embodiments improve on the prior art through use of an attributed dynamic graph to capture the spatial and temporal pattern of the behavior of fall armyworm in an integrated way. Further, one or more embodiments employ an inventive use of the graph convolution network (GCN) to predict the severity of the FAW attack. Yet further, one or more embodiments can even be applied to a region where no historical data of FAW attack is present. This is possible by employing the inductive learning capability, based on GCN, of one or more embodiments. Indeed, one or more embodiments predict fall armyworm (FAW) attack severity over time for a set of locations of interest by analyzing a graph, wherein the graph (i.e., graph structure where weights of the edges change over time) uses the set of locations to capture the spatial and dynamic pattern(s) of the FAW attack.

Again, one or more embodiments construct a dynamic graph (i.e., graph structure where weights of the edges change over time) using the set of locations (to capture the spatial and dynamic/temporal pattern of FAW attack); assign node features using weather data and node labels using existing data of FAW attack; learn a Graph Convolution Network (GCN) with an added L2 penalty term (between the parameter matrices of graph convolution for any two graphs from the consecutive time steps,) on the constructed graph and predict the labels (severity of FAW attack at time t) of other nodes of the dynamic graph using the GCN (transductive learning); and predict the severity of FAW attack on the nodes of another dynamic graph where all the nodes are unlabeled (by the inductive capability (predicting on a completely unseen data)).

One or more embodiments advantageously capture the dynamic behavior of the weather conditions between different locations (such as wind speed, direction etc.) and their relation with the FAW attack over multiple time intervals, using an attributed dynamic graph.

Figure 7:
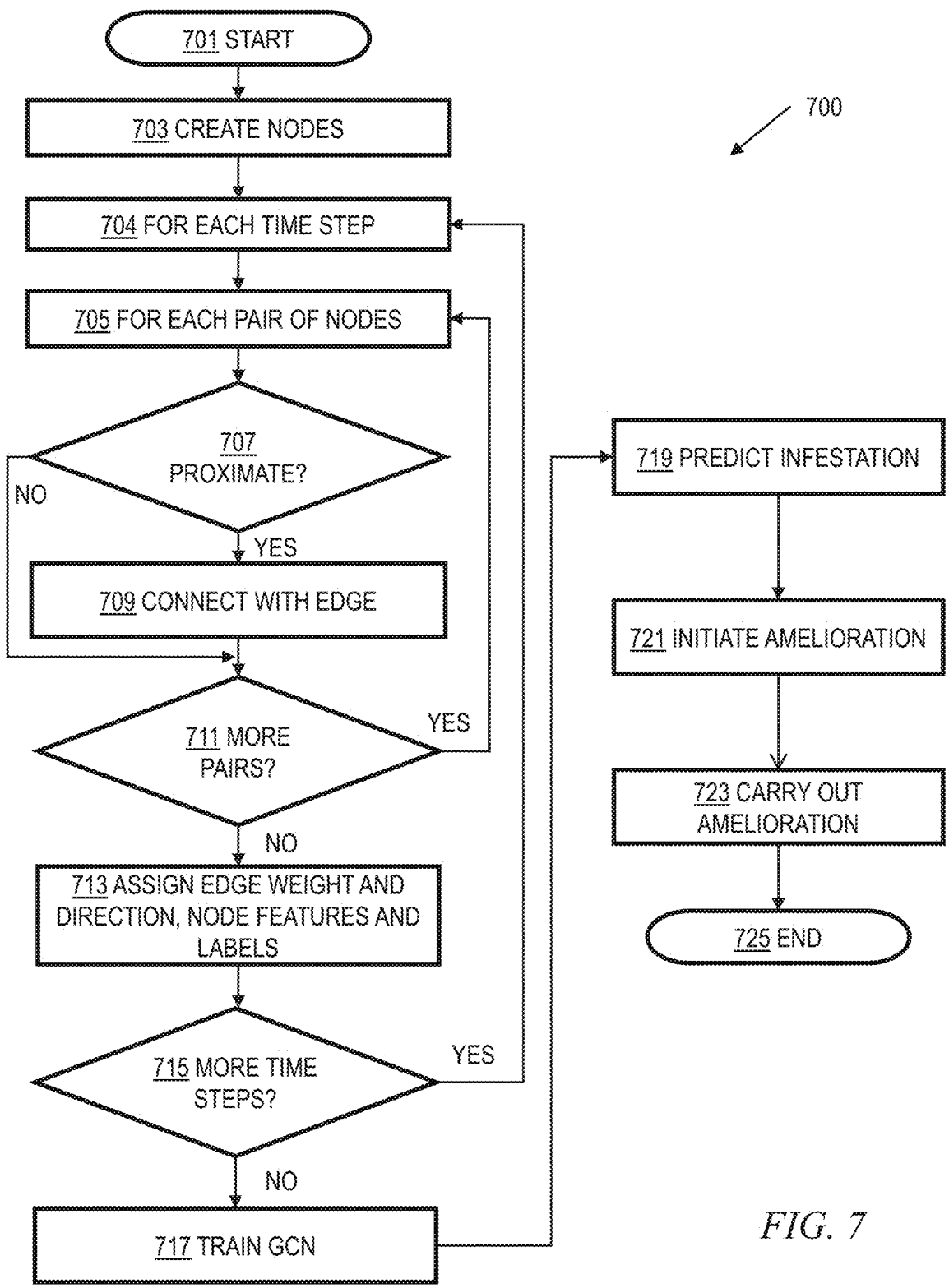
FIG. 7 is a flow chart of an exemplary method, according to an aspect of the invention.

Given the discussion thus far, with continued reference to FIGS. 3-6, and with reference also now to the flow chart 700 of FIG. 7, which begins at 701, it will be appreciated that, in general terms, an exemplary method 700, according to an aspect of the invention, includes creating, in a computer memory (e.g. 28 in FIG. 8 discussed below), a data structure representing a dynamic graph including a plurality of nodes and a plurality of edges connecting the nodes, at a plurality of time steps, wherein each node corresponds to a geographic location in a first area. Pest infestation information, relating to an airborne pest whose propagation depends on weather and wind speed, is available for a subset of the geographic locations. Each edge connects two of the nodes which are geographically proximate; has a direction, for a given one of the time steps, based on relative wind direction between the two nodes for the given one of the time steps; and has a weight, for the given one of the time steps, based on relative wind speed between the two nodes for the given one of the time steps. For example, as seen at step 703, create the nodes. Then, as at steps 704 and 705, loop through certain steps for each pair of nodes, and for a plurality of time steps. In decision block 707, determine whether each pair of nodes is geographically proximate (for example, distance between them does not exceed a threshold distance). If they are proximate, as per the YES branch, connect them with an edge at step 709 and proceed to decision block 711; else, (NO branch) proceed to decision block 711 without connecting that pair of nodes.

In decision block 711, determine whether there are additional pairs of nodes to analyze for proximity; if so (YES branch), return to step 705; else (NO branch), proceed to step 713. In step 713, the edge directions and weights are assigned as discussed. Furthermore, in the data structure, assign features to each of the nodes for each of the time steps based on weather data at the corresponding geographic locations at each of the time steps, and, in the data structure, assigning labels to each of the nodes for each of the time steps, corresponding to pest infestation severity for each of the time steps. The labels are assigned to those of the nodes corresponding to the subset of the geographic locations for which the pest infestation information is available. The assigning by time step is seen at decision block 715; if there are more time steps (YES branch), return to step 704; else (NO branch), proceed to step 717.

Step 717 includes training a graph convolutional network on the dynamic graph with the assigned features and assigned labels. Step 719 includes, based on predicted future weather conditions for a second area different than the first area, using the trained graph convolutional network to predict, via inductive learning, pest infestation severity for future times for a new set of nodes corresponding to new geographic locations in the second area for which no pest infestation information is available. That is to say, in one or more embodiments, all the new nodes for which prediction is to be carried out are unlabeled. Block 301 has data about FAW attack. Use this FAW attack data to train the GCN for the region corresponding to 301. Then, use the trained GCN on region 303 to predict FAW severity, even though 303 does not have any FAW attack data.

One or more embodiments further include step 721, initiating at least one amelioration action based on predicted pest infestation severity for the future times for the new set of nodes. In a non-limiting example, the initiation of the at least one amelioration action includes sending an electronic alert to mobile devices 54A of a plurality of farmers in a region having high predicted pest infestation severity for the future times for the new set of nodes (e.g. from a server running service 96 over a suitable wireless network).

One or more embodiments further include step 723, carrying out the at least one amelioration action. For example, famers who receive the alert apply an environmentally-friendly pesticide; plant a trap crop (such as Napier grass) adjacent a valuable crop such as maize; and/or deploy natural enemies of the pest, such as parasitic wasps, in each case, preferably working in concert with governmental authorities to assure safety.

Flow chart 700 ends at 725.

It should be noted that examples have been provided in the context of fall armyworm; thus, in one or more embodiments, the pest infestation information relates to fall armyworm. However, aspects are generally applicable to pests that depend on weather conditions, wind speed/direction, and the like. Thus, aspects disclosed herein can be generalized by the skilled artisan to other pests or diseases which can spread spatially with wind speed and so on.

In one or more embodiments, the weather data includes temperature, relative humidity, and precipitation. The skilled artisan will appreciate that a psychrometric chart or the like can be used to relate dry bulb temperature, wet bulb temperature, relative humidity, specific humidity, and actual humidity; suitable conversions can be carried out to obtain desired data when different weather data than that desired is available.

In one or more embodiments, connecting the two of the nodes which are geographically proximate is based on a threshold distance.

In another aspect, referring to FIG. 8, discussed further below, an exemplary apparatus includes a memory 28, and at least one processor 16, coupled to the memory, and operative to carry out or otherwise facilitate any one, some, or all of the method steps described herein. Some embodiments further include a network interface 20 coupled to the at least one processor; the initiation of the at least one amelioration action includes the at least one processor sending, over the network interface, an electronic alert to mobile devices 54A of a plurality of farmers in a region having high predicted pest infestation severity for the future times for the new set of nodes.

One or more embodiments of the invention, or elements thereof, can be implemented in the form of an apparatus including a memory and at least one processor that is coupled to the memory and operative to perform exemplary method steps. FIG. 8 depicts a computer system that may be useful in implementing one or more aspects and/or elements of the invention, also representative of a cloud computing node according to an embodiment of the present invention. Referring now to FIG. 8, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 8:
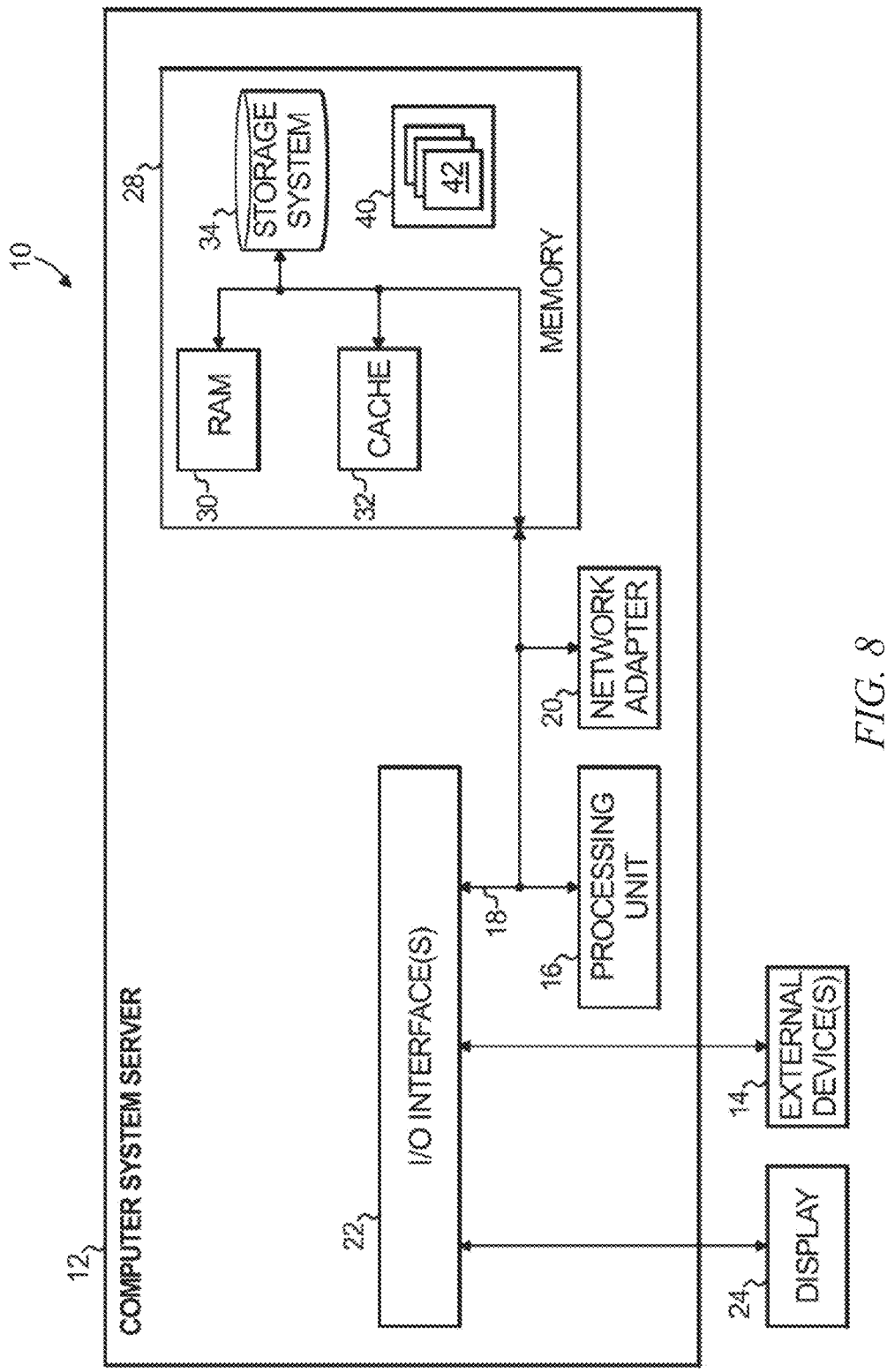
FIG. 8 depicts a computer system that may be useful in implementing one or more aspects and/or elements of the invention, also representative of a cloud computing node according to an embodiment of the present invention.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a cloud-based service 96 for predicting fall armyworm using weather and spatial dynamics, located in layer 90.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method comprising:
creating, in a computer memory, a data structure representing a dynamic graph including a plurality of nodes and a plurality of edges connecting said nodes, at a plurality of time steps, wherein each node corresponds to a geographic location in a first area, wherein pest infestation information, relating to an airborne pest whose propagation depends on weather and wind speed, is available for a subset of said geographic locations, and wherein each edge:

connects two of said nodes which are geographically proximate, wherein connecting said two of said nodes which are geographically proximate is based on a threshold distance;

has a direction, for a given one of said time steps, based on relative wind direction between said two nodes for said given one of said time steps; and has a weight, for said given one of said time steps, based on relative wind speed between said two nodes for said given one of said time steps;

in said data structure, assigning features to each of said nodes of said dynamic graph for each of said time steps based on weather data at said corresponding geographic locations at each of said time steps;

in said data structure, assigning labels to each of said nodes of said dynamic graph for each of said time steps, corresponding to pest infestation severity for each of said time steps, said labels being assigned to those of said nodes corresponding to said subset of said geographic locations for which said pest infestation information is available;

training a graph convolutional network on said dynamic graph with said assigned features and assigned labels; and based on predicted future weather conditions for a second area different than said first area, using said trained graph convolutional network to predict, via inductive learning, pest infestation severity for future times for a new set of nodes corresponding to new geographic locations in said second area for which no pest infestation information is available;

further comprising initiating at least one amelioration action based on predicted pest infestation severity for said future times for said new set of nodes;

wherein said initiation of said at least one amelioration action comprises sending an electronic alert to mobile devices of a plurality of farmers in a region having high predicted pest infestation severity for said future times for said new set of nodes.

2. The method of claim 1, further comprising carrying out said at least one amelioration action.

3. The method of claim 2, wherein said at least one amelioration action comprises applying a pesticide.

4. The method of claim 2, wherein said at least one amelioration action comprises planting a trap crop adjacent a valuable crop.

5. The method of claim 2, wherein said at least one amelioration action comprises deploying natural enemies of said pest.

6. The method of claim 1, wherein said pest infestation information relates to fall armyworm.

7. The method of claim 1, wherein said weather data includes temperature, relative humidity, and precipitation.

8. A non-transitory computer readable medium comprising computer executable instructions which when executed by a computer cause the computer to perform the method of:

creating, in a memory of the computer, a data structure representing a dynamic graph including a plurality of nodes and a plurality of edges connecting said nodes, at a plurality of time steps, wherein each node corresponds to a geographic location in a first area, wherein pest infestation information, relating to an airborne pest whose propagation depends on weather and wind speed, is available for a subset of said geographic locations, and wherein each edge:

connects two of said nodes which are geographically proximate, wherein connecting said two of said nodes which are geographically proximate is based on a threshold distance;

has a direction, for a given one of said time steps, based on relative wind direction between said two nodes for said given one of said time steps; and has a weight, for said given one of said time steps, based on relative wind speed between said two nodes for said given one of said time steps;

in said data structure, assigning features to each of said nodes of said dynamic graph for each of said time steps based on weather data at said corresponding geographic locations at each of said time steps;

in said data structure, assigning labels to each of said nodes of said dynamic graph for each of said time steps, corresponding to pest infestation severity for each of said time steps, said labels being assigned to those of said nodes corresponding to said subset of said geographic locations for which said pest infestation information is available;

training a graph convolutional network on said dynamic graph with said assigned features and assigned labels; and based on predicted future weather conditions for a second area different than said first area, using said trained graph convolutional network to predict, via inductive learning, pest infestation severity for future times for a new set of nodes corresponding to new geographic locations in said second area for which no pest infestation information is available;

wherein said method further comprises initiating at least one amelioration action based on predicted pest infestation severity for said future times for said new set of nodes;

wherein said initiation of said at least one amelioration action comprises sending an electronic alert to mobile devices of a plurality of farmers in a region having high predicted pest infestation severity for said future times for said new set of nodes.

9. The non-transitory computer readable medium of claim 8, wherein said weather data includes temperature, relative humidity, and precipitation.

10. An apparatus comprising:

a memory; and at least one processor, coupled to said memory, and operative to:

create, in said memory, a data structure representing a dynamic graph including a plurality of nodes and a plurality of edges connecting said nodes, at a plurality of time steps, wherein each node corresponds to a geographic location in a first area, wherein pest infestation information, relating to an airborne pest whose propagation depends on weather and wind speed, is available for a subset of said geographic locations, and wherein each edge:

connects two of said nodes which are geographically proximate, wherein connecting said two of said nodes which are geographically proximate is based on a threshold distance;

has a direction, for a given one of said time steps, based on relative wind direction between said two nodes for said given one of said time steps; and has a weight, for said given one of said time steps, based on relative wind speed between said two nodes for said given one of said time steps;

in said data structure, assign features to each of said nodes of said dynamic graph for each of said time steps based on weather data at said corresponding geographic locations at each of said time steps;

in said data structure, assign labels to each of said nodes of said dynamic graph for each of said time steps, corresponding to pest infestation severity for each of said time steps, said labels being assigned to those of said nodes corresponding to said subset of said geographic locations for which said pest infestation information is available;

train a graph convolutional network on said dynamic graph with said assigned features and assigned labels; and based on predicted future weather conditions for a second area different than said first area, use said trained graph convolutional network to predict, via inductive learning, pest infestation severity for future times for a new set of nodes corresponding to new geographic locations in said second area for which no pest infestation information is available;

wherein said at least one processor is further operative to initiate at least one amelioration action based on predicted pest infestation severity for said future times for said new set of nodes;

further comprising a network interface coupled to said at least one processor, wherein said initiation of said at least one amelioration action comprises said at least one processor sending, over said network interface, an electronic alert to mobile devices of a plurality of farmers in a region having high predicted pest infestation severity for said future times for said new set of nodes.

11. The apparatus of claim 10, wherein said weather data includes temperature, relative humidity, and precipitation.

\* \* \* \* \*